Patented Apr. 20, 1954

2,676,139

UNITED STATES PATENT OFFICE 2,676,139

HYALURONIDASE

Howard Tint, Philadelphia, and Richard Bogash, Oreland, Pa., assignors, by mesne assignments, to American Home Products Corporation, New York, N. Y., a corporation of Delaware No Drawing. Application September 1, 1950, Serial No. 182,893

7 Claims. (Cl. 195—66)

This invention relates to the preparation of a product rich in hyaluronidase and more particularly relates to a method for obtaining hyaluronidase-active material in a highly purified form, and the product so obtained.

Methods for isolation and purification of hyaluronidase have been suggested heretofore utilizing either an inorganic salt precipitating procedure or depending on the use of an organic precipitant such as alcohol or acetone in an acid environment for precipitating the activity. The products obtained by either of these procedures or even by a combination of them are not satisfactory since they are unduly contaminated with toxic and inert substances.

An object of this invention is to obtain a highly purified and strongly active hyaluronidase composition.

Another object is to obtain a purified and active hyaluronidase product with a minimum amount of toxic and inert substances.

Other objects will be apparent from the description and the claims.

The invention comprises a series of steps which, at various stages, will result in hyaluronidase fractions of different degrees of purity. Whether one selects any group of steps or all of them depends on the desired stage of purity sought in the final product.

The complete process may be described as follows. Bovine testicular tissue or other source material rich in hyaluronidase is ground and extracted with an aqueous but preferably a dilute acidic solution. The largely aqueous extract, freed of solids, is then treated with an inorganic salt having substantial water-solubility, preferably ammonium sulfate, although sodium or potassium sulfate, sodium or potassium chloride, etc., can be used. To minimize possible effect of denaturation, low temperatures, desirably below 5° C. are preferred. This causes the precipitation of undesired materials. The solids are then separated from the solution which contains the activity.

The salt content of the solution is now increased by further additions of the selected salt. The solid precipitate containing the activity is isolated and freed of more impurities by suspending in water, and dialyzing against cold distilled water until freed of anion. The clarified liquid may now be dried, yielding a partially purified hyaluronidase product having about twice the activity as the arbitrary standard. The latter is defined hereinbelow.

The partially purified product either in solution before drying or the dried residue which is first solubilized, is adjusted to a concentration of about 1–5% by weight. The pH of the solution is adjusted to substantially neutral, with permissible variations ranging from about pH 6 to 9 with preference toward the alkaline end, and the ionic strength of the solution is brought to about 0.15 to 0.2. While one may operate from minimal to 0.3 ionic strength, it has been discovered that an ionic strength of approximately 0.15 gives exceptionally good results.

The solution, having the proper pH and ionic strength, is cooled to about 0° C., and a water-soluble, low-boiling protein precipitating agent such as an alcohol, a glycol or acetone is added with further cooling to about −6° C., the agent being in an amount sufficient to obtain a concentration in the solution of about 15–20% by volume. A precipitation of relatively inactive material is obtained and the precipitate is discarded.

The organic solution is maintained between about −3 to −9° C. as the concentration is increased by addition of more precipitating agent so that there is approximately 20–40% by volume, again with the higher ranges preferred. This procedure results in the precipitation of a large proportion of the active hyaluronidase fraction having substantially increased potency over the original material. This precipitate may be isolated, diluted with water and lyophilized to obtain a substantial yield of a highly desirable, purified hyaluronidase product.

The water-soluble organic precipitating agent may be any organic liquid capable of precipitating proteins. It must be completely water-soluble, however, even in the presence of salts. Acetone, methyl and ethyl alcohols and ethylene and propylene glycols are examples of operable precipitating agents with ethanol particularly preferred.

It has been found that the highly potent product obtained as above described may be still further increased in potency by carrying out a further precipitation of impurities with a water-soluble, organic agent but in the acid pH range. However, a more preferred procedure because of the better product obtained is to utilize salting-out operations. The latter will now be described in more detail.

The purified hyaluronidase fraction isolated after the last high-concentration protein precipitation step with the organic precipitating agent is diluted with water and sufficient inorganic salt is added to secure approximately 20–30% by weight of salt per 100 ml. solution. This results in a precipitation of relatively inactive fractions which are removed and discarded. Again the salt used may be any inorganic salt having a substantial water solubility, preferably over 20% by weight, with ammonium sulfate preferred.

The salt solution is then increased in concentration by addition of more salt, ranging in amount from about 30% by weight per 100 ml. solution up to complete saturation. The activity is precipitated by the higher salt concentration and the active precipitate is removed, dialyzed to separate out salts, filtered and lyophilized to obtain a hyaluronidase fraction of exceptional purity.

It should be noted that while the precipitation steps using the water-soluble organic agent were carried out on a partially purified material, one may use the same procedure on the initial extract, adjusting the characteristics of the extract in pH, ionic strength and temperature for proper operation. The salting-out procedure may then follow, if desired.

In adjusting solutions of active material to the proper ionic strength, the pH of the solution is first adjusted to the desired point with buffering agent. If additional ionic strength is desired or needed sodium chloride is then added to adjust the solution to the exact ionic strength desired. Many known buffering agents ranging from weakly acid through neutral to weakly alkaline nature may be used. As suitable buffering agents for obtaining a pH in the range of about 6 to approximately 8 one may use, for example, a mixture of potassium dihydrogen phosphate and disodium hydrogen phosphate, adjusting the amount of each to give the desired pH. For obtaining a pH in the range of about 8 to approximately 9, one may use the sodium salt of veronal, or a mixture of sodium carbonate and sodium bicarbonate, or a mixture of mono-potassium phosphate and borax. It should be understood that other buffering agents may be used to give the desired pH and ionic strength, as taught by Kolthoff and Rosenblum in "Acid-Base Indicators" (Macmillan 1937).

When referring to the ionic strength of the buffered hyaluronidase-active solution, it should be understood that the values are taken as those that would be obtained if the same amount of buffer salts were dissolved in water at 25° C.

The following example illustrates the entire process in detail, but it should be clearly understood that the example is illustrative and not limitative of the invention.

Bovine testes were decapsulated and finely ground. To 1 part of this material was added 1 part of water containing 6 ml. of glacial acetic acid per liter, the material being thoroughly extracted in the cold. After the extraction is complete, the mixture is centrifuged and the solids are discarded.

To the liquid extract thus obtained is added solid ammonium sulfate to the extent of 212 grams per liter in order to obtain 30% of saturation with salt. A precipitate, low in hyaluronidase activity, is obtained and removed.

The liquid fraction, freed of solid material is now further saturated with ammonium sulfate to the extent of 282 grams per liter obtaining approximately 70% of saturation with salt. An active precipitate is thrown down which is recovered. This precipitate is suspended in a minimum amount of water, and the solution is dialyzed and then filtered. The filtrate is then lyophilized to obtain a partially purified but still crude hyaluronidase fraction.

The crude hyaluronidase product obtained is dissolved in water to a 1% solids concentration. The pH is adjusted to give a pH of 7 and the ionic strength is adjusted to 0.15 with disodium hydrogen phosphate buffer and NaCl.

The solution is now cooled to about 0° C. and absolute ethanol is added with cooling to obtain a concentration of about 20% by volume. An inactive precipitate results which is removed and discarded.

Absolute ethanol is again added with cooling to about −6 to −9° C. to obtain a concentration of about 40% by volume. A substantial precipitate results from this step which is a highly active and potent hyaluronidase fraction. This precipitate is removed, diluted with water and lyophilized. The product is approximately 7 times as active as the original crude obtained by the ammonium sulfate salting-out process.

To increase the potency of the hyaluronidase still further, the product is dissolved in water and ammonium sulfate is added in amount to give a concentration of 25-30% by weight of salt per 100 ml. solution. An inactive precipitate is formed which is removed and discarded. More ammonium sulfate is now added to obtain a concentration in the neighborhood of complete saturation and the highly purified and active hyaluronidase fraction is precipitated. The precipitate is dialyzed, filtered and lyophilized. The purified product is approximately 21 times as active as the original crude material obtained from the first salting-out process.

The activity of the different enzyme preparations is determined by measuring the turbidity reduction of potassium hyaluronate substrate carried out substantially in the manner of Kass and Seastone, J. Exp. Med., 79, p. 319 (1944), with the following changes. Purified potassium hyaluronate was used instead of the relatively high inhibiting and impurity content of the prior art material. In addition, sodium chloride is added in sufficient amount to counteract the effect of any inhibitors still present in the hyaluronate substrate. A standard crude enzyme sample, prepared according to the method of Madinaveitia, Biochem. J., vol. 35, p. 447 (1941) is tested for turbidity reduction at a series of selected dilutions, and a curve is drawn. The unknown sample is diluted to an appropriate concentration falling within the limits of the curve and is tested for turbidity reduction. The activity is then read from the standard curve in terms of the standard enzyme concentration. The standard enzyme preparation has been arbitrarily assigned a turbidity reducing activity of 1 T. R. U. per mg. of protein, which is substantially equivalent to about 150 turbidity reducing units on the Kass and Seastone scale.

The hyaluronidase products obtained by the above new procedures have potencies ranging from approximately 4 turbidity reducing units per mg. to well over 40 T. R. U. per mg. The complete alcoholic precipitation procedures alone produce a product having a potency of about 14 T. R. U per mg. The latter potency substantially exceeds the strength considered necessary for general therapeutic purposes.

Having thus set forth our invention, we claim:
1. A process for obtaining a hyaluronidase product comprising, dissolving crude hyaluronidase derived from animal tissue in a substantially aqueous medium to form a solution of approximately 1-5% by weight, adjusting the pH of the solution within the range of substantially pH 6 to not more than pH 9, also adjusting the ionic strength to below 0.3, lowering the temperature to below 5° C. and then adding sufficient water-soluble, organic precipitating agent to obtain a concentration of about 20-40% by volume, thereby precipitating the hyaluronidase product from said solution.

2. The process of claim 1; wherein the ionic strength is adjusted to approximately 0.15 to 0.2.

3. In a process for obtaining a highly active hyaluronidase product wherein animal tissue containing hyaluronidase is treated with a substantially aqueous medium in order to extract therefrom a crude hyaluronidase fraction and which is then contacted with water-soluble inorganic salts at different concentrations to first precipitate a relatively inert fraction and then a relatively active fraction, and wherein the relatively active fraction is selectively removed and dialyzed to separate out excess salts therefrom, the improvement comprising dissolving the relatively active fraction in an aqueous medium to a concentration of about 1 to 5% by weight, adjusting the pH of the solution to within the range of substantially pH 6 to 9 and the ionic strength to about 0.15 to about 0.2, adjusting the temperature of the solution to approximately 0° C., adding a water-soluble, organic, protein-precipitating agent to said solution in an amount to obtain a concentration of approximately 15 to 20% by volume of said protein-precipitating agent, discarding the precipitate obtained, and then precipitating an active hyaluronidase product by adding sufficiently more water-soluble, organic precipitating agent to obtain a substantially higher concentration but not exceeding about 40% by volume of agent in said solution, said solution being maintained below about 0° C. during said organic agent precipitations.

4. A process for obtaining a hyaluronidase product comprising, dissolving crude hyaluronidase derived from animal tissue in a substantially aqueous medium to form a solution of approximately 1 to 5% by weight, adjusting the pH of the solution within the range of substantially pH 6 to not more than pH 9, also adjusting the ionic strength to about 0.15-0.2, lowering the temperature to approximately 0° C., adding a water-soluble, organic precipitating agent to said solution to obtain a concentration of approximately 15-20% by volume and thereby precipitating inactive impurities, removing said precipitate, and then precipitating an active fraction of hyaluronidase by adding additional organic precipitating agent to obtain a substantially higher concentration but not exceeding about 40% of agent, by volume.

5. A process for obtaining a hyaluronidase product comprising, dissolving crude hyaluronidase derived from animal tissue in a substantially aqueous medium to form a solution of approximately 1 to 5% by weight, adjusting the pH of the solution within the range of substantially pH 6 to not more than pH 9, also adjusting the ionic strength to about 0.15 to 0.2, lowering the temperature to approximately 0° C., adding a water-soluble, organic precipitating agent to said solution to obtain a concentration of approximately 15-20% by volume and thereby precipitating inactive impurities, removing said precipitate, precipitating an active fraction of hyaluronidase by adding additional organic precipitating agent to obtain a substantially higher concentration but not exceeding about 40% of agent, by volume, removing the active precipitate, solubilizing the latter in water and salting-out a highly refined product by the addition of a salt to said solution.

6. A process for obtaining a hyaluronidase product comprising dissolving crude hyaluronidase derived from animal tissue in a substantially aqueous medium to form a solution of approximately 1 to 5% by weight, adjusting the pH of the solution within the range of substantially pH 6 to not more than pH 9, also adjusting the ionic strength to about 0.15 to about 0.2, lowering the temperature to approximately 0° C., adding a water-soluble, organic precipitating agent to said solution to obtain a concentration of approximately 15-20% by volume and thereby precipitating inactive impurities, removing said precipitate, precipitating an active fraction of hyaluronidase by adding additional organic precipitating agent to obtain a substantially higher concentration but not exceeding about 40% of agent, by volume, removing the active precipitate, solubilizing the latter in water, adding a substantially water-soluble salt to obtain a concentration of about 25-30% by weight of salt, discarding the precipitate formed, adding from about 30% to substantially complete saturation of said salt to obtain a second precipitate and separating the active precipitate formed at the higher salt concentration.

7. A process for obtaining a hyaluronidase product comprising, dissolving crude hyaluronidase derived from animal tissue in a substantially aqueous medium to form a solution of approximately 1 to 5% by weight, adjusting the pH of the solution to about pH 7, also adjusting the ionic strength to about 0.15, lowering the temperature to approximately 0° C., adding alcohol to said solution to obtain a concentration falling in the range of about 15-20% by volume and thereby precipitating relatively inactive material, then adding additional alcohol to obtain a substantially higher concentration but not exceeding about 40% of alcohol by volume, and thereby precipitating an active fraction relatively rich in hyaluronidase.

References Cited in the file of this patent

Madinaveitia, Biochem. J., vol. 35, 447 (1941).

Hahn, Biochem Z., vol. 315 (1943), page 83-96, published by Julius Springer, Linkstr. 22/24, Berlin W 9, Ger.

Freeman et al., J. Biol. Chem., September 1949, pages 655-662.